United States Patent [19]
Schmidt

[11] Patent Number: 5,810,644
[45] Date of Patent: Sep. 22, 1998

[54] METHOD OF SHAPING A FRICTION FACING FOR FRICTION PLATE ASSEMBLIES

[75] Inventor: Rainer Schmidt, Wetter, Germany

[73] Assignee: Borg-Warner Automotive, Inc., Sterling Heights, Mich.

[21] Appl. No.: 810,294

[22] Filed: Mar. 3, 1997

[51] Int. Cl.⁶ .............................. B24B 1/00; B41J 11/62
[52] U.S. Cl. .............................. 451/29; 451/38; 451/445; 451/902
[58] Field of Search .......................... 29/898.13; 451/29, 451/38, 39, 40, 445, 902

[56] References Cited

U.S. PATENT DOCUMENTS

| | | | |
|---|---|---|---|
| 2,005,456 | 6/1935 | Creager | 451/29 X |
| 3,545,996 | 12/1970 | Duncan | 451/29 X |
| 4,828,893 | 5/1989 | Tallman | 451/29 X |
| 5,197,234 | 3/1993 | Gillenwater | 451/29 |
| 5,490,807 | 2/1996 | Marchell | 451/29 X |
| 5,593,528 | 1/1997 | Dings et al. | 451/29 X |

*Primary Examiner*—Timothy V. Eley
*Attorney, Agent, or Firm*—Emch, Schaffer, Schaub et al; Greg Dziegielewski

[57] ABSTRACT

A method of shaping a friction facing or lining is disclosed. A lining blank is positioned on a core member and a template having the desired groove patterns and periphery is mounted on the blank. Particles are directed against the template and the blank to form the lining grooves and peripheries. The particles also remove hanging fibers. In another embodiment, a template is placed over a friction facing or lining which has grooves formed by other methods. The particles remove any undesired material or hanging fibers from either the grooves or periphery or both.

3 Claims, 4 Drawing Sheets

5,810,644

METHOD OF SHAPING A FRICTION FACING FOR FRICTION PLATE ASSEMBLIES

BACKGROUND OF THE INVENTION

The present invention relates to a method of making friction plate assemblies. Friction plate assemblies are well known in the art and generally comprise one or more friction facings which are bonded to a core plate to form the friction plate assemblies.

The friction plate assemblies are then incorporated into interleaved clutch packs. One application is to use friction plate assemblies in automatic transmissions. Current transmissions often include shifting, starting or lock-up clutch assemblies having high stopping conditions where increased friction energy is developed. These higher friction energy levels result in increased thermal conditions which tend to reduce the life of the friction plate assemblies as well as the life of the surrounding fluid, such as oil.

To lower the temperature levels, the friction facings are provided with complex groove designs which hold fluid, such as oil, to ensure constant cooling conditions. The grooves are designed to handle the required oil flows, differential pressures and speeds.

It has also been found that it is often desirable to maximize the groove depths to the thickness of the friction lining or facing.

When the friction plate assemblies are used in different conditions, the problem of frayed fiber material at the edges of the grooves or periphery of the friction facings is greater. The type of fibers which are used to produce friction linings or facings are, for example, tough aramid fibers which are difficult to cut and very durable under wear, heat and pressure. When cutting the edges of the friction facings by prior art methods, it was not unusual for frayed or hanging fibers to result from the cutting process. The are sometimes termed lining overhangs. With more complex grooves being designed and with more severe temperature and pressure conditions being present, the frayed or hanging fiber problem resulting from most prior art methods of making friction facings leads to numerous failures. The exposure of the loose fibers and the associated pressure, heat and geometry of the friction plate assembly results in premature failure of the friction plate assemblies.

SUMMARY OF THE INVENTION

The present invention is directed to a method of shaping a friction facing positioned on a core member. The friction facing defines a plurality of friction facing grooves and a predetermined friction facing periphery. The friction facing is first positioned on the core member. A template having the predetermined shaped grooves or the predetermined peripheral shape is placed over the friction facing and is blasted with particles to remove the groove portions from the friction facing and to remove excess fiber material from the friction facing adjacent the predetermined friction facing periphery. Grooves of different and complex shapes can be formed by the present method by using a template defining those shapes. In addition, the grooves can have a maximum depth which corresponds to the facing or lining thickness. The blasting particles remove any loose fibers from the edges of the grooves and from the facing periphery thereby reducing the risk of failure of the completed friction plate assembly.

DESCRIPTION OF THE PREFERRED EMBODIMENTS

Figure 1:
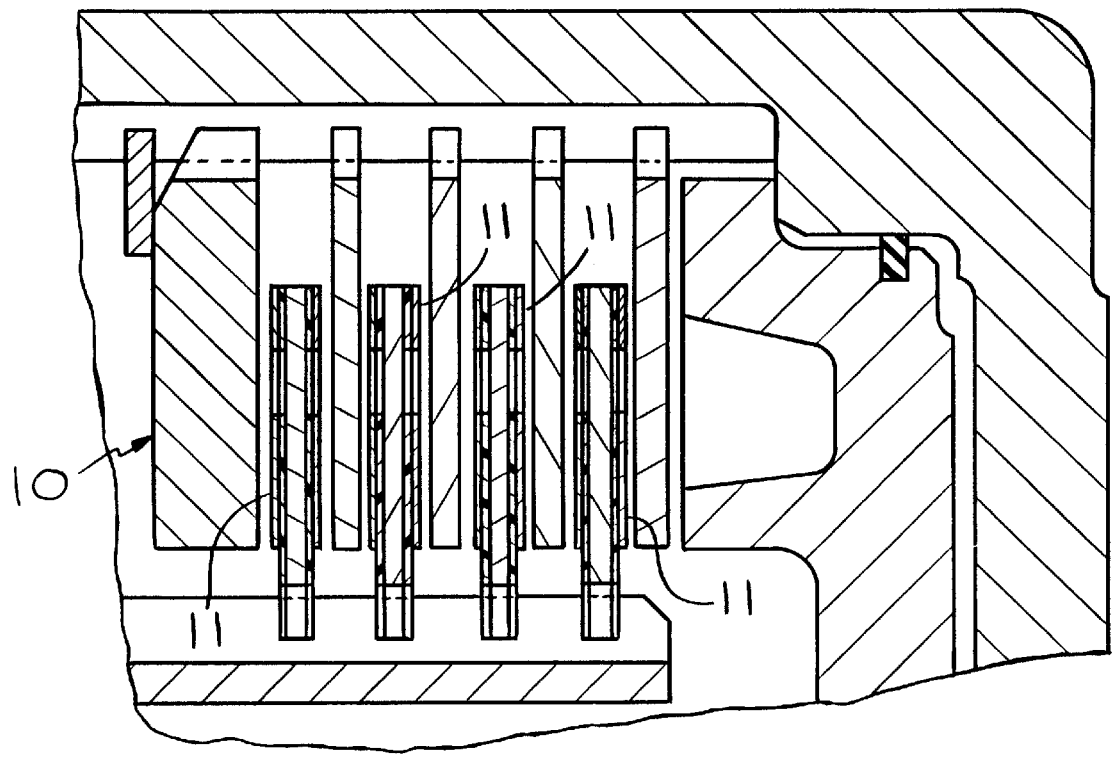
FIG. 1 is a fragmentary cross sectional view of a housing, having a clutch pack which includes a plurality of friction plate assemblies.

Referring to FIG. 1, a vehicle transmission clutch assembly is generally illustrated by the reference number 10. The clutch includes a plurality of interleaved friction plate assemblies 11.

Figure 2:
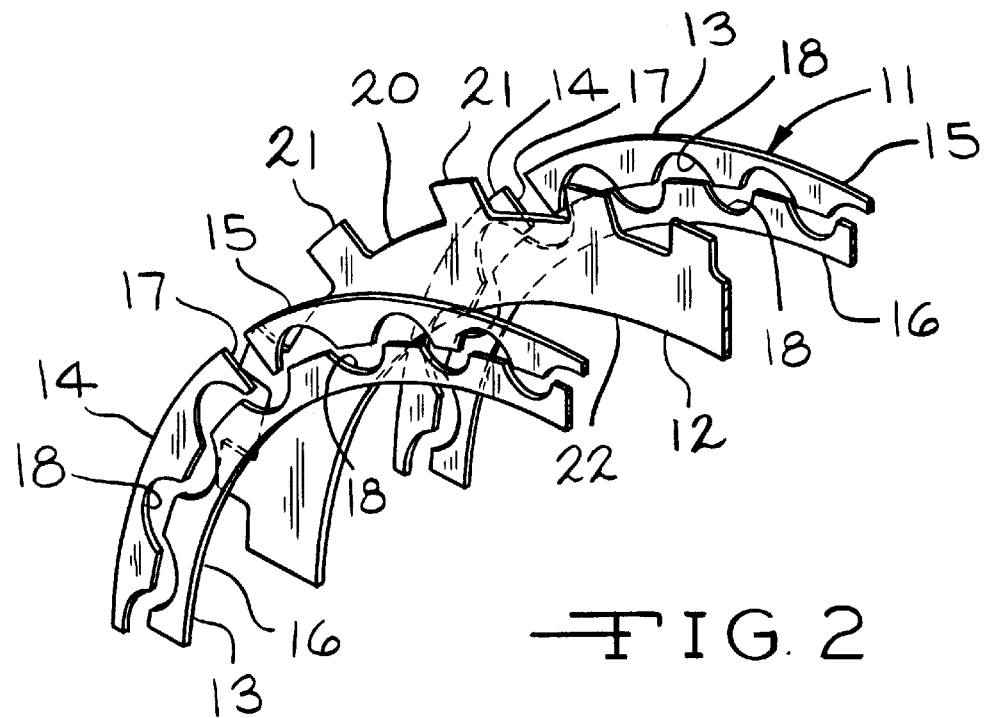
FIG. 2 is a fragmentary exploded view of a friction plate assembly, as shown in FIG. 1.
Figure 3:
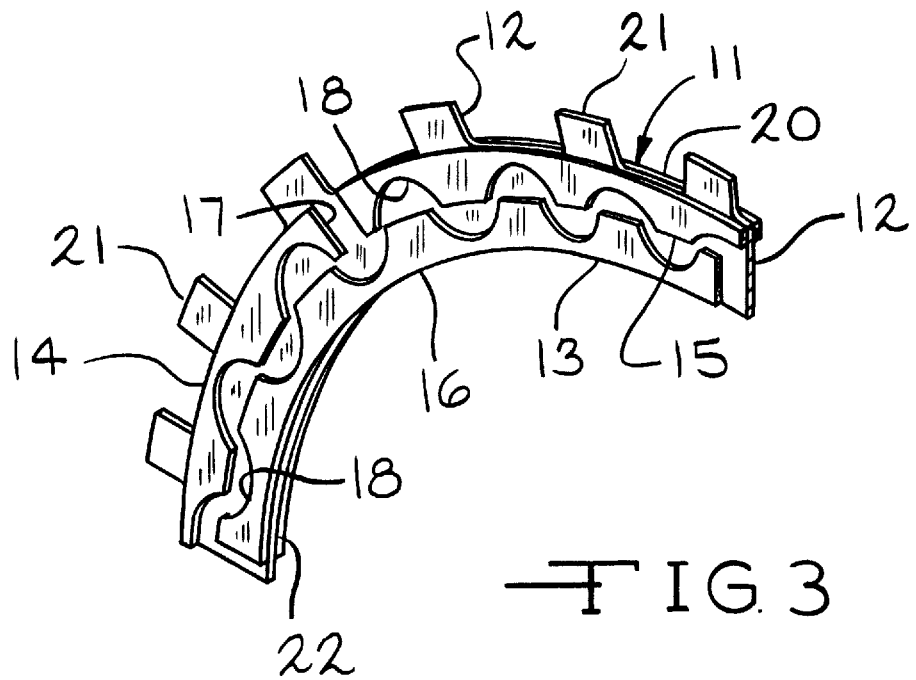
FIG. 3 is a fragmentary perspective view of the completed friction plate assembly of FIGS. 1 and 2.

Referring to FIGS. 2 and 3, the friction plate assemblies 11, include a metal core plate 12 and a pair of friction facings 13 mounted on each surface of the core plate 12. In other embodiments, only a single friction facing is mounted on one side of the core plate. The present method of grooving friction facing or lining material may also be used where the friction facing or lining is mounted directly on a transmission or torque converter housing using the housing as the core plate.

Friction plate assemblies are well known in the art. Normally, the core plate is constructed of metal. The friction facings are usually blanked as a ring and are sometimes segmented. In the FIG. 2 embodiment, the friction facings 13 include outer segments 14 and 15 and an inner segment 16. The outer segments 14 and 15 define oil grooves or passageways 17 which communicate with grooves 18 which are defined by the friction facing segments 14, 15 and 16. The number and shape of the grooves are illustrative and not a part of the present invention. A wide variety of grooving patterns are commonly used in modern friction plates. The grooving patterns are used to improve cooling oil circulation. Because of high performance applications, the groove patterns have become more complex to obtain more efficient cooling. In the present embodiment, shown in FIG. 2, the depth of the grooves 18 is the thickness of the friction facings 13.

While the friction plate assembly 11 includes a pair of friction facings 13, in other embodiments only a single friction facing is mounted on the core plate. As mentioned above, the core can be the housing of a transmission or a torque converter. In high cooling applications it is normally preferable to have a friction facing mounted on both sides of the core plate as shown in FIG. 3.

In the present embodiment, the core plate 12 includes an outer periphery 20 defining a plurality of tabs 21 and an inner periphery 22.

In the present embodiment, the friction facings 13 define a plurality of surfaces which result in the predetermined grooves 17 and 18. The predetermined grooves, according to the present method can have many shapes including the radial, parallel, and waffle groove shapes known in the art.

Figure 6:
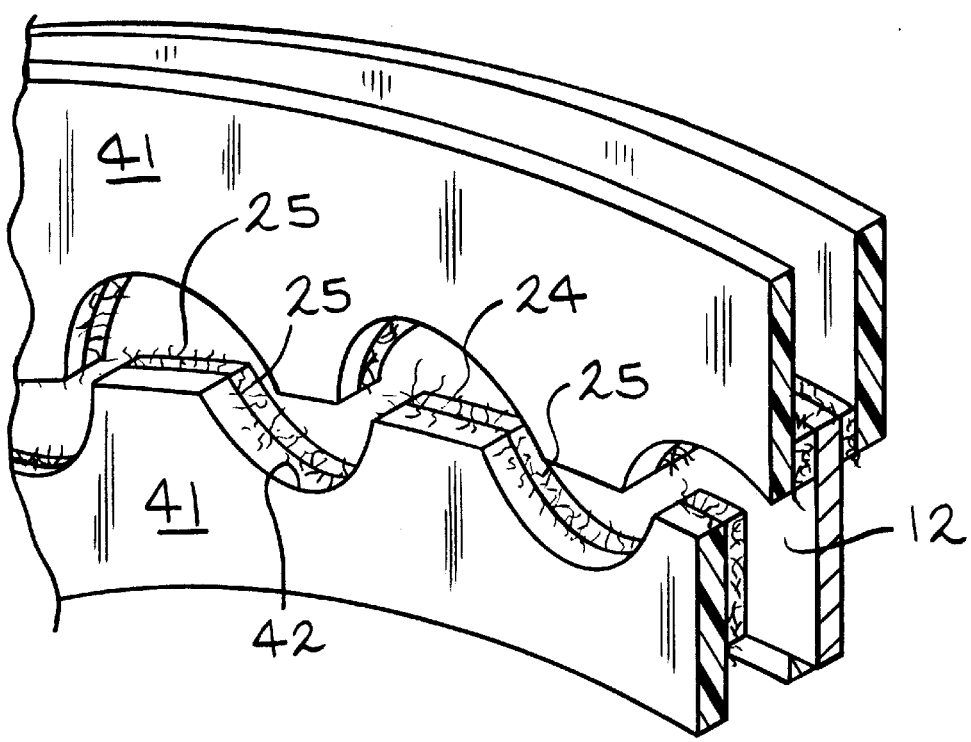
FIG. 6 is an enlarged view of another embodiment of the method of the present invention and illustrating the undesired friction facing hangings adjacent the grooves.

When forming grooves in friction facings in the prior art, they were normally molded or machine cut which leads to limited groove designs and groove depths. The prior art methods often resulted in grooves having frayed or hanging fiber materials at their edges. FIG. 6 illustrates a prior art cut or pre-shaped friction facing 24 having undesired hanging fibers 25. The fibers are drawn out of scale in FIG. 6 for illustrative purposes.

The present method of making friction plate assemblies includes using templates to form the entire predetermined grooves in the friction facings or to form and clean the edges of grooves previously pre-shaped by prior art methods. Under the present method, both the predetermined groove shapes can be formed; the predetermined outer peripheries can be formed; or both the predetermined grooves and peripheries can be formed. In some embodiments, the present method is used as a "deburring" operation to remove undesired overhanging facing or lining material.

Figure 4:
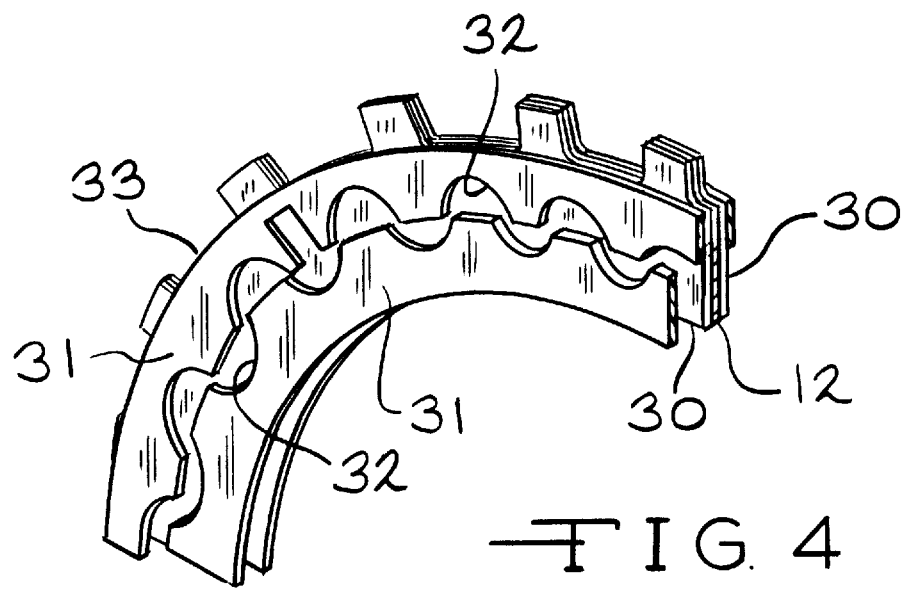
FIG. 4 is a fragmentary perspective view illustrating the method of the present invention where a non-grooved friction facing blank is positioned on a core plate and a grooved template placed over the friction facing blank.

In the present method of forming grooves and the removal of overhanging fibers, friction facing blanks or blank segments 30 are positioned on the core or core plate 12, as shown in FIG. 4. A template 31 defining predetermined grooves 32 and a predetermined friction facing periphery 33 is placed over the blank friction facing segments 30 (See FIG. 4).

Figure 5:
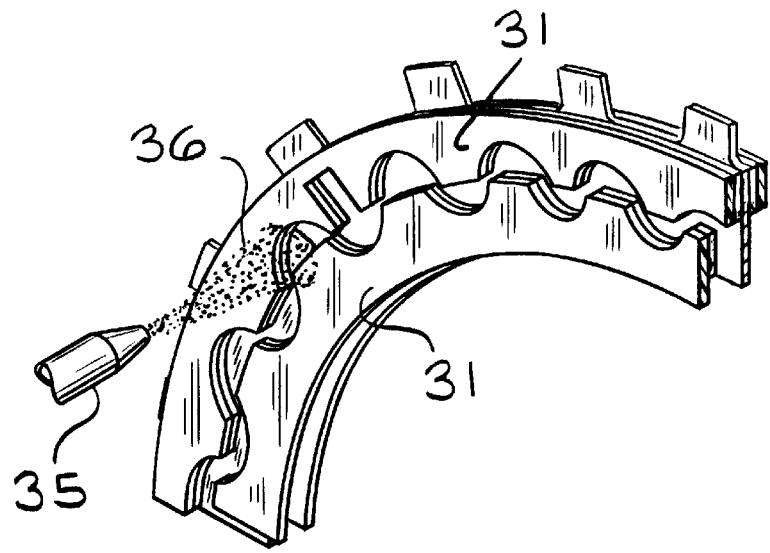
FIG. 5 is a perspective view showing a blasting nozzle emitting particles against the friction facing to form the predetermined grooves and predetermined friction facing periphery which is defined by the template.

Referring to FIG. 5, in the next step, a nozzle 35 emits a stream of particles 36 against the template 31 removing undesired material from the friction facing blanks 30 until the predetermined grooves 18 are formed matching the template grooves 32 and the friction facings 13 have their desired peripheries 20, 22 as defined by the template peripheries 33. At this time, the template assembly is reversed and the opposite friction facing 13 is formed.

In other embodiments, a number of friction facing assemblies are blasted to form the final friction facings on one side of the core plate. At a subsequent time, the operation is repeated to define the predetermined grooves on friction facing on the reverse side of the assembly.

Figure 7:
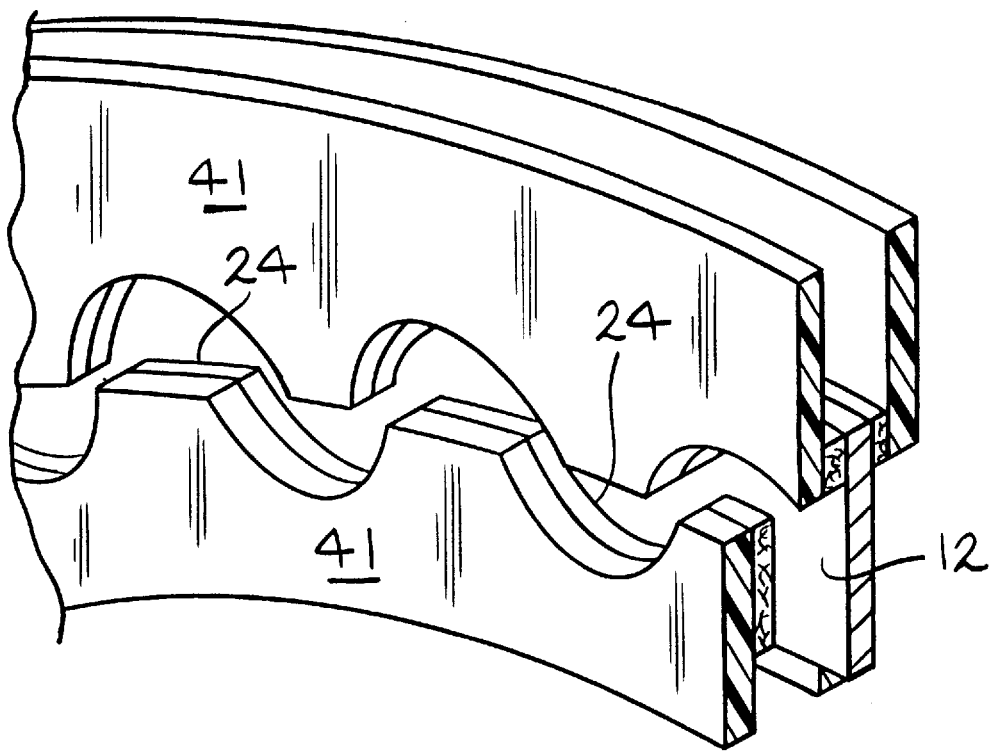
FIG. 7 is an enlarged view similar to FIG. 6 showing the grooves formed by the present method after removal of the friction facing hangings by the particle blasting, according to the present invention.

Referring to FIGS. 6 and 7, another embodiment of the method of the present invention is illustrated. In this embodiment, a preformed or pre-shaped lining or friction facing 24, having a plurality of undesired hanging fibers 25, is positioned on the core plate or core member 12. A template 41 defining predetermined grooves 42 is placed over the preformed friction facing 24.

In the next step, the nozzle 35 emits the particles 36, such as sand blasting particles, against the template 41 to clean or define the preformed grooves of the friction facing 24 by eliminating the undesired hanging fibers 25. The particles can remove the overhanging lining material as well as loose fibers.

The completed assembly having the clean predetermined grooves is illustrated in FIG. 7, prior to the removal of the template 41.

Many revisions may be made to the above disclosed embodiments without departing from the scope of the present invention or from the following claims.

I claim:

1. A method of shaping a friction facing positioned on a core member by using a template defining a plurality of predetermined grooves comprising the steps of:

positioning the friction facing on said core member, placing the template over said friction facing, said template defining said predetermined grooves, blasting said template and said friction facing with particles to remove said groove portions from said friction facing and to remove excess fiber material from said friction face, whereby the particles remove loose fibers from the edges of the grooves.

2. A method of shaping a friction facing, according to claim 1, wherein said template has a predetermined outer periphery, including the step of:

blasting said template and said friction facing with particles to remove undesired friction facing material adjacent said predetermined outer periphery, whereby the particles remove loose fibers from the edges of the friction facing outer periphery.

3. A method of removing loose fibers from a preformed friction facing having grooves and an outer periphery, said friction facing to be positioned on a core member, comprising the following steps:

positioning the preformed friction facing on said member, placing a template having predetermined grooves and periphery on said preformed friction facing, blasting said template and said preformed friction facing with particles, whereby the particles remove undesired friction facing material, including any loose fibers from the friction facing grooves and periphery.

\* \* \* \* \*